Figure 2:
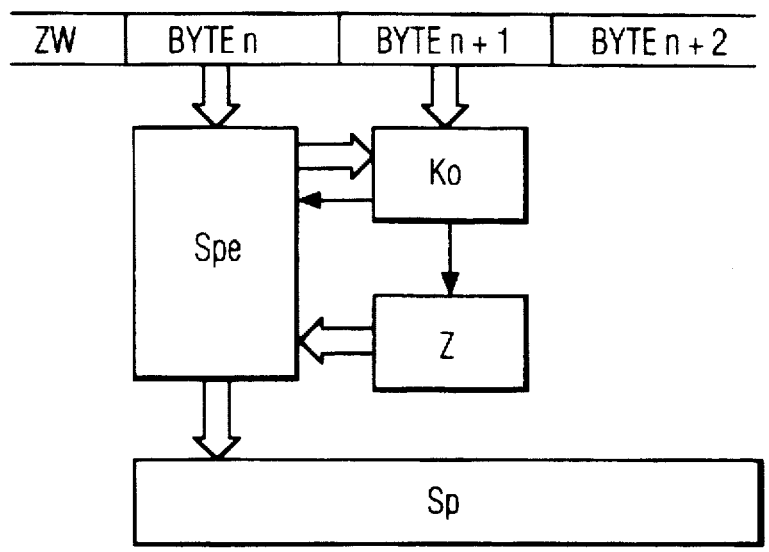

United States Patent [19]

Gyarmati et al.

[11] Patent Number: 5,777,684
[45] Date of Patent: Jul. 7, 1998

[54] MINIMIZATION OF MEMORY FOR TELETEXT DATA

[75] Inventors: Sandor Gyarmati, Villingen-Schwenningen; Reinhard Lachenmaier, Trossingen, both of Germany

[73] Assignee: Deutsche Thomson Brandt GmbH, Villingen-Schwenningen, Germany

[21] Appl. No.: 455,017

[22] Filed: May 31, 1995

[30] Foreign Application Priority Data

Jul. 2, 1994 [DE] Germany .......................... 44 23 232.2

[51] Int. Cl.⁶ ........................................... H04N 7/087
[52] U.S. Cl. ........................................ 348/468; 348/465
[58] Field of Search ............................... 348/468, 465, 348/556, 553, 564, 563, 714, 716, 718; H04N 2/087

[56] References Cited

U.S. PATENT DOCUMENTS

| | | | |
|---|---|---|---|
| 4,277,838 | 7/1981 | Chambers | 348/465 |
| 4,845,662 | 7/1989 | Tokumitsu | 348/468 |
| 5,374,961 | 12/1994 | Jang | 348/468 |
| 5,467,142 | 11/1995 | Ichinokawa | 348/556 |
| 5,532,752 | 7/1996 | Miyano | 348/468 |

*Primary Examiner*—Victor R. Kostak
*Attorney, Agent, or Firm*—Joseph S. Tripoli; Frederick A. Wein

[57] ABSTRACT

To reduce the time required to access serially transmitted teletext data, such data is often stored in memory. The present invention reduces the otherwise required memory size by storing the characters in proportional form and/or with duplicated characters not stored a plurality of times but stored with information on the number of times a character is duplicated.

7 Claims, 2 Drawing Sheets

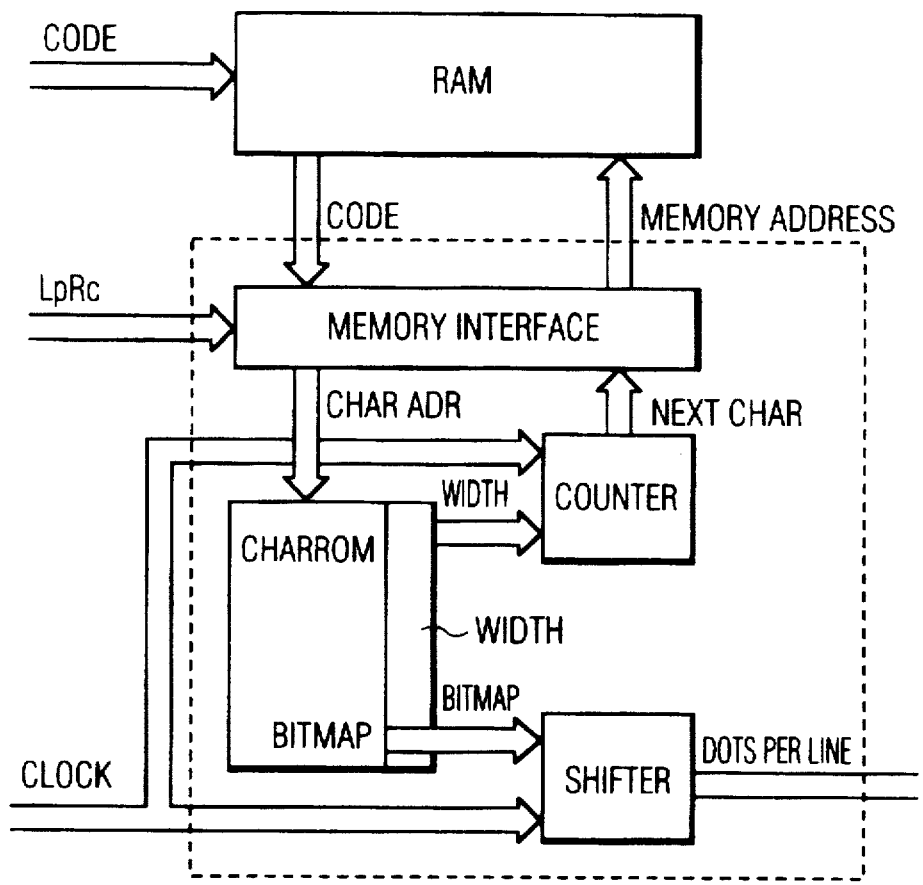
FIG. 1.1
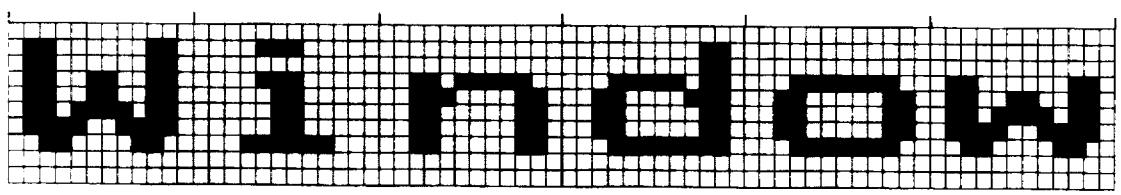
FIG. 1.2
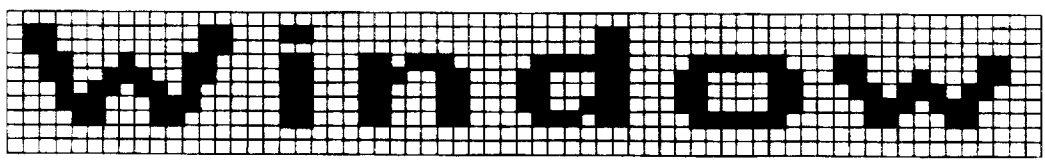
FIG. 1.3

MINIMIZATION OF MEMORY FOR TELETEXT DATA

BACKGROUND

The invention is based on a method for minimizing the memory in the case of teletext data.

Teletext contains information on sport, politics, the weather, the news, film programme summaries and much more. These data are offered by different transmitting companies and can be decoded with a decoder and displayed page by page on a television set. The data are transmitted by the transmitting companies in serial form, that is to say page by page. If the user now uses the remote controller of his television to select a page, the decoder then waits until it can receive this page. After receiving the data for this page, said data are displayed to the user on the screen. If the entered page is not available, this is indicated to the user. The large number of pages results in the user having to wait a very long time for the selected page. In order to reduce this time, it is known for a large memory to be provided in which the transmitted teletext data are stored, so that fast access can be achieved.

The invention is based on the object of providing a method by means of which it is possible to minimize the required memory size.

The character generators which are used, for example, in present-day conventional videotext processors operate using constant-clock logic, that is to say the entries in the MEMORY (RAM) are read and displayed using a fixed clock. This constant time results in a space of equal size always being available for displaying a character on the screen. This results in non-proportional display of the characters.

It is now intended to display the characters proportionally, that is to say in accordance with their graphical width (m is broader than i), this requires modified display logic.

According to the invention, a counter is used in the circuit. This counter has the object of determining the time for accessing the memory of the next character as a function of the width of the letters. To do this, it requires a width signal (Width) which indicates the number of pixels per line of the letter, and a clock signal (Clock) by means of which the pixels are shifted out of the output register.

If the number of pixels specified in the width signal (Width) have now been outputted, the counter passes the signal for reading in the next character (next char) to the processor unit which controls the memory and causes the latter to initiate the next access to the memory (RAM). The initialization of the counter (Counter) now creates a capability of displaying letters proportionally; this is because, as a result of the different values of the width signals (Width) (for example Width (i)=5, Width (m)=16), the signal for the next character (next char) in which the accesses to the memory (RAM) are made is aperiodic and the widths of the letters thus differ from one another.

BRIEF DESCRIPTION OF THE DRAWINGS AND DETAILED DESCRIPTION OF THE PREFERRED EMBODIMENTS

FIG. 1 illustrates an exemplary embodiment of the development.

FIG. 1.1 shows:

memory RAM in which the code of the characters to be displayed is stored;

Character memory CHARROM, in which the Bitmap and, additionally, the width Width of the character as well are stored;

Memory interface MEMORYINTERFACE, which controls the output from the RAM and with the aid of the Code and of the counter lines per row LpRc, which indicates which line is currently being read out of the character matrix, determines the character address Char adr;

Counter COUNTER;

Output shift register SHIFTER for parallel-serial conversion;

Clock signal CLOCK, which predetermines the bit frequency (for example 12 MHz for the present 4:3 format).

When the data are read in, the text is written directly into the memory RAM. At the time when a character is displayed (or the screen layout in the background in the case of a pixel memory is displayed), the counter COUNTER is initialized with the width Width which it obtains in accordance with the Code from the table in the character memory CHARROM; the Bitmap is loaded into the output register SHIFTER. The counter COUNTER counts the clock pulse CLOCK which controls the output of the dots from the shift register SHIFTER and, on reaching the width value Width, passes the pulse of the next character next char to the memory interface MEMORYINTERFACE in order to read the next character from the memory RAM.

FIG. 1.2 illustrates writing with a constant separation.

FIG. 1.3 illustrates writing with proportional spacing.

In a development of the invention, data compression is carried out when teletext data are stored. Repetition of a character and the unequal distribution of the letters are typical of the contents of teletext pages at upgrade level 1 (Level 1). When such a page is stored, it would be advantageous to be able to use such characteristics for data compression. The two indicated methods make this possible.

Figure 3:
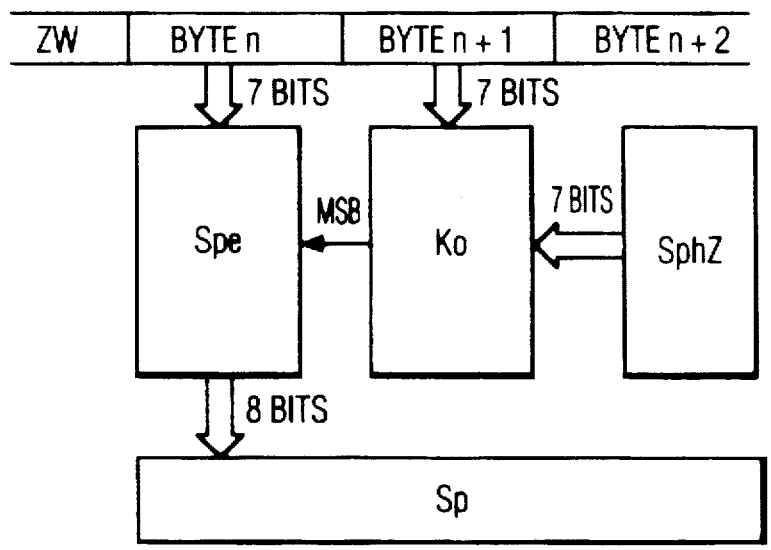
Figure 4:
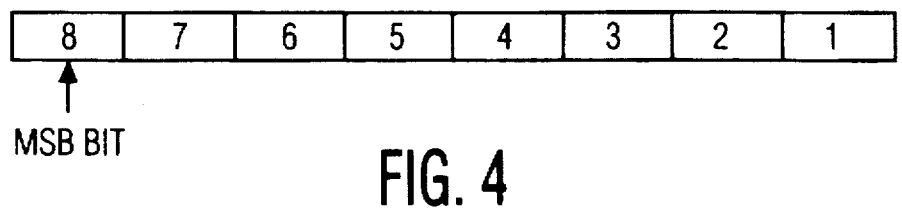

FIGS. 2–4 describe further processing.

Method 1) Repetition

When one and the same letter is repeated, it is entirely sufficient to store the letter once, together with the number of repetitions. 80 h is suitable as a sequence tag since this code is neither transmitted nor can it be produced by the subsequent method (00 h is also not transmitted in Level 1).

Method 1) is explained in the following text with reference to an example (FIG. 2).

The following sequence indicates a character repetition:

| Occc cccc | 1000 0000 | 10nn nnnn |
|-----------|-----------|-----------|
| Character | Sequence tag | Number |

This code is produced by hardware:

If the comparator receives the same value from memory interface Spe and from the next address in the buffer store ZW, it starts the counter Z and stops transmission to the memory Sp. Instead of this, the memory interface Spe emits the value 80 h. When the repetition ends, that is to say the next buffer address contains a different value, the comparator Ko stops the counter Z and the latter passes its value to the memory interface Spe for storage. In this way it is possible to save memory space by storing the frequency of a character.

Method 2) Frequency

The statistical distribution of the frequency of the occurrence of different letters in continuous texts differs widely. However, it can be observed that every language has its preferred letters (for example, the "e" is the commonest in German). This may even differ from line to line since such a frequency can also arise in the block mosaic area.

Furthermore, the blank character (Blank) has a special position in this analysis because it occurs most frequently in texts as the separation between the words (particularly in languages which do not join words together as is normal in German).

The parity bit can be used, after it has been evaluated, to indicate the occurrence of such a "common letter".

The rule is as follows:

When the letter which has been identified as the commonest occurs, the MSB bit (the 8th bit) of the preceding (or of the subsequent) letter is set. In consequence, the character itself need not be stored. However, only every other character can be eliminated in the case of direct repetition.

Method 2) is explained in the following text with reference to an example (FIG. 5).

FIG. 3 shows the memory interface Spe, the comparator Ko, the memory Sp for the most common character SphZ and the buffer store ZW with the preceding byte. If the comparator identifies that a letter occurs relatively frequently in the buffer store ZW, this letter is stored in the memory Sp as the commonest character SphZ and the MSB bit is also set.

In this way it is possible to implement proportional spacing in order to save memory size.

a) Algorithm with a variable character

The line is first investigated for the commonest letter. The letter in which the MSB is set for the first time is marked as that which is intended to be used when the MSB occurs again.

The following character chain

|Blank| der |Blank| See is coded as: ("e" having been defined as the commonest letter)

20 44 E5 72 20 D3 65

(the E5 h signals that the "e"(65 h) is intended to be inserted whenever the set MSB occurs. The next "e" will thus be produced by the MSB in the case of the "S" (53 h) D3 h) . The second "e" in "See" cannot be eliminated).

b) Algorithm with a determined character

A letter is determined for one language (that is to say for a complete cycle) or for all the languages of the decoder which would be the most common (for example: "e", "n" or else space), that is to say the investigation and, the tag are omitted on the first occurrence. The further procedure is as in the case of a).

The character chain

[Blank] der [Blank] See is thus coded: ("e" being determined to be the most common letter)

20 C4 72 20 D3 65

(the MSBs of C4 h and D3 h signal that an "e" must be inserted next in each case. The second "e" in "See" cannot be eliminated here either)The code 80 h which is used as the sequence tag in the repetition method cannot be produced by setting the MSB in the case of standardized transmission (the code 00 h must not be used in accordance with WST Level 1). As a result of this unambiguity of the two methods, it is possible to combine them.

d=44 hex de=C4 hex=44 hex+BSB bit

FIG. 4 shows eight bits, seven bits being intended for storage of data and the eighth bit, the MSB bit, being used to indicate the most common letter.

We claim:

1. A circuit comprising:

input means for teletext data;

a memory in which said teletext data are stored;

means for generating for a character of the teletext data a width signal corresponding to the width of said character and a bitmap signal corresponding to the shape of said character; and output means for outputting said width signal and bitmap signals.

2. The circuit of claim 1 further comprising means for counting clock signals, said means being initialized by said width signal, and generates a signal for reading in the next character in dependence on said width signal and said counting.

3. The circuit of claim 1, wherein said width signal and bitmap signal are fed from said output means to display means for displaying the characters with proportional spacing.

4. The circuit of claim 1 further comprising a character memory in which the width signals and the bitmap signals are stored for the different characters.

5. A circuit comprising:

input means for teletext data;

means for comparing first teletext data with successive second teletext data;

means for counting, said means starts counting if said first and second teletext data are identical; and a memory, in which said teletext data are stored, wherein for successive teletext data which are identical, the teletext data are only stored once and the number of identical teletext data is also stored.

6. A circuit comprising:

input means for teletext data;

means for comparing a first teletext data with a most frequently used teletext data;

means for modifying a second teletext data if the first teletext data are equal to the most frequently used teletext data; and a memory for storing said second teletext data.

7. The circuit of claim 6, wherein teletext data are transferred a byte at a time and said means for modifying changes the most significant bit of one of a preceding byte and a subsequent byte.

* * * * *